United States Patent [19]
Miyauchi et al.

[11] 3,929,724
[45] Dec. 30, 1975

[54] METHOD OF MANUFACTURING A POLYETHYLENE COMPOSITION CONTAINING AN AGING INHIBITOR

[75] Inventors: Hirokazu Miyauchi; Hironaga Matsubara, both of Osaka, Japan

[73] Assignee: Sumitomo Electric Industries, Ltd., Osaka, Japan

[22] Filed: July 13, 1973

[21] Appl. No.: 379,103

Related U.S. Application Data

[63] Continuation-in-part of Ser. No. 126,949, March 22, 1971, abandoned.

[52] U.S. Cl. ...... 260/45.9 R; 260/45.95; 260/897 B
[51] Int. Cl.² ......................................... C08L 23/08
[58] Field of Search ... 260/897 B, 41.5 MP, 45.9 R, 260/45.95

[56] References Cited
UNITED STATES PATENTS

| | | | |
|---|---|---|---|
| 3,399,250 | 8/1968 | Kirk et al. | 260/897 |
| 3,533,976 | 10/1970 | Eidman | 260/28.5 |

*Primary Examiner*—Carman J. Seccuro
*Attorney, Agent, or Firm*—Carothers and Carothers

[57] ABSTRACT

This invention relates to a method of manufacturing a polyethylene compound chiefly used for crosslinked polyethylene cable. More particularly, it relates to a polyethylene compound prepared by compounding a master batch of ethylene-vinyl acetate copolymer (compounded with an aging inhibitor at a temperature which is not below the melting point of the selected aging inhibitor), with low density polyethylene and a crosslinking agent.

5 Claims, No Drawings

METHOD OF MANUFACTURING A POLYETHYLENE COMPOSITION CONTAINING AN AGING INHIBITOR

CROSS REFERENCE

This application is a continuation-in-part of application Ser. No. 126,949 filed Mar. 22, 1971, now abandoned.

BACKGROUND OF THE INVENTION

1. Field of the Invention

For some time now, special attention has been paid to the aging characteristics and electrical characteristics of crosslinked polyethylene compounds for electric cables as opposed to those characteristics of similar compounds used for other ordinary purposes. Improvement in these characteristics of crosslinked polyethylene for cable insulation is strongly demanded.

2. Description of the Prior Art

For the improvement of aging characteristics, aging inhibitors have been used. The method heretofore employed for adding such an inhibitor is one in which an aging inhibitor is added directly to the final compound as is. However, this method has not been quite satisfactory in order to obtain high quality characteristics as an electrical insulator.

SUMMARY OF THE INVENTION

A method of manufacturing a polyethylene compound wherein a master batch is prepared by compounding 100 weight parts of ethylene-vinyl acetate copolymer containing 10 – 35 weight-% vinyl acetate and 1 – 20 weight parts of an aging inhibitor of at least one kind at a temperature at least equal to the melting point of the selected aging inhibitor. Then the master batch so mixed is compounded with ordinary low density polyethylene and a compounding agent. The master batch is included with the low density polyethylene and a crosslinking agent in a quantity such that the final mixture contains no more than one part of said aging inhibitor per each one hundred parts resin and an average quantity of vinyl acetate of no more than five weight per cent of the resin.

DETAILED DESCRIPTION OF THE INVENTION

This invention provides a crosslinked polyethylene compound which is superior to similar compounds used in the past with respect to the afore-mentioned two requirements, i.e., the aging characteristic and the electrical characteristics.

This invention relates to a method of manufacturing a polyethylene compound provided by compounding a master batch prepared by compounding 100 weight parts of ethylene-vinyl acetate copolymer containing 10 – 55 weight-% of vinyl acetate and 1 – 10 weight parts of an aging inhibitor at a temperature which is not below the melting point of the selected aging inhibitor, and ordinary low density polyethylene and a crosslinking agent and, if necessary, a filler or the like in suitable quantities.

The master batch is added to the polyethylene in a quantity such that the final product (the polyethylene compound) contains one part or less of the aging inhibitor selected as against 100 parts of the resin contained in the compound. The quantity of the master batch is also regulated such that the average quantity of the vinyl acetate found in the final product or compound must not exceed 5 weight-% of the resin.

The present invention relates to a method of including an aging inhibitor with polyethylene, and thus by regulating the quantity of the aging inhibitor in the final product, the quantity of the master batch is also directly regulated in view of the fact that the aging inhibitor included in the master batch must be included in the amount of 1 – 20 weight parts as against 100 parts of the resin.

However, the quantity of master batch included with a given quantity of polyethylene is also regulated by the vinyl acetate content limits which must be found in the final product. For example, it is intended that the polyethylene compound contain 1 part of the aging inhibitor as against 100 parts of the resin. Since the quantity of the aging inhibitor in the master batch may be 1 – 20 weight parts, the quantity of the master batch required will be small if a master batch containing a large proportion (such as 20 weight parts) of the aging inhibitor is used. On the other hand, if the quantity of the aging inhibitor in the master batch is small, then it will be necessary to use a very large quantity of the master batch. In this situation, the use of the master batch will become meaningless and the characteristics of the polyethylene will be affected. It is accordingly necessary to define the quantity of the master batch to be added to the polyethylene.

For these reasons, it is not sufficient to merely define the quantity of vinyl acetate to be added. Ethylene-vinyl acetate becomes more like or resembles polyethylene as its vinyl acetate content decreases. Consequently, the ethylene-vinyl acetate used in the present invention is restricted to ethylene-vinyl acetate of which the vinyl acetate content is 10 – 35 weight-%. However, ethylene-vinyl acetate having a vinyl acetate content of 10 weight-%. and ethylene-vinyl acetate having a vinyl acetate content of 35 weight-% have different influences respectively on the properties of the final product. Accordingly, the quantity of the master batch is correctly defined in terms of the quantity of the vinyl acetate found in the final product rather than by directly defining ratios between the master batch and the amount of polyethylene included in the mixture. With this in mind, the quantity of the master batch included in the mixture of the present invention is such that the average quantity of the vinyl acetate included in the final product may not exceed 5 weight-% of the resin.

Examples of its embodiment and examples for comparison will be described hereinafter.

The testing methods employed in these examples of embodiment are as follows:

The master batch was prepared by compounding the resin for the master batch with the aging inhibitor with rollers. Then this master batch, low density polyethylene and the crosslinking agent, and the filler or like substances where added as necessary, were compounded with rollers.

Comparison of aging characteristics was made with tensile strength and elongation as parameters after aging by means of a gear-type oven.

Electrical characteristics were evaluated with tan δ and AC breakdown values as the parameters.

In the Table, SA stands for very excellent characteristics, A stands for excellent characteristics, B for good characteristics and C for poor characteristics.

(Notes)
*1 Melt flow index (g/10 mm) . . . ASTM D-1238
*2 Di-α-cumylperoxide
*3 4-4'-thio-bis-(6-tertiary-butyl-m-cresol)
*4 Ethylene-vinyl acetate copolymer
*5 Royalene 301 of Uniroyal Company in U.S.A.
*6 Ethylene-ethylacrylate copolymer made by U.C.C. in U.S.A.
*7 N-N'-di-β-naphthyl-P-phenylenediamine
*8 Condensation product of aldol and α-naphthylamine Reference examples are provided for comparison.

Table

| | Base Resin | Master Batch Resin | Quantity of aging inhibitor in master batch (Weight parts as against 100 weight parts of master batch resin) | Master batch compounding temperature (°C) | Quantity of crosslinking agent in weight parts (weight parts as against 100 weight parts of total resin) | Quantity of aging inhibitor in weight parts (Weight parts as against 100 weight parts of total resin) | Aging Characteristics | Electrical characteristics | Average VA content of final product (%) |
|---|---|---|---|---|---|---|---|---|---|
| Ref. 1 | low density polyethylene *1 MI - 1.1 | not used | — | — | *2 DCP 3 | *3 SWC 0.3 | C | A | — |
| Ref. 2 | " | low density polyethylene MI = 1.1 | 10 | 130 | " | " | C | A | — |
| Ref. 3 | " | " | " | 180 | " | " | B | A | — |
| Ref. 4 | " | *4 EVA vinyl acetate content 5 weight-% | " | " | " | " | B | A | 0.15 |
| Ex. 1 | low density polyethylene *1 MI - 1.1 | EVA vinyl acetate content 10 weight-% | 10 | 180 | *2 DCP 3 | *3 SWC 0.3 | A | SA | 0.3 |
| Ex. 2 | " | EVA vinyl acetate content 15 weight-% | 10 | " | " | " | A | SA | 0.45 |
| Ex. 3 | " | " | 20 | " | " | " | A | SA | 0.23 |
| Ex. 4 | " | " | " | " | DCP 2 | SWC 0.2 | A | SA | 0.15 |
| Ex. 5 | " | EVA vinyl acetate content 35 weight-% | 10 | " | DCP 3 | SWC 0.3 | A | SA | 1.05 |
| Ref. 5 | " | EVA vinyl acetate content 40 weight-% | " | " | " | " | A | B | 1.2 |
| Ref. 5' | " | EVA vinyl acetate content 35 weight-% | 30 | " | " | " | A | B | 0.35 |
| Ref. 6 | low density polyethylene *1 MI - 1.1 | EVA vinyl acetate content 40 weight-% | 20 | 180 | DCP 3 | SWC 0.3 | A | B | 0.6 |
| Ref. 7 | " | EVA vinyl acetate content 50 weight-% | 10 | " | " | " | A | C | 1.5 |
| Ref. 8 | " | *5 EP gum | " | " | " | " | C | A | — |
| Ref. 9 | " | *6 DPDB 6169 | " | " | " | " | B | A | — |
| Ref. 10 | " | chlorinated PE | " | " | " | " | B | B | — |
| Ref. 11 | EVA vinyl acetate content 5 weight-% | EVA vinyl acetate content 5 weight-% | " | " | " | " | A | B | 5 |
| Ref. 12 | EVA vinyl acetate content 15 weight-% | EVA vinyl acetate content 15 weight-% | " | " | " | " | A | C | 10 |
| Ex. 6 | low density polyethylene MI = 4 | EVA vinyl acetate content 15 weight-% | 10 | 180 | DCP 3 | SWC 0.3 | A | A | 0.45 |
| Ex. 7 | Example 1 + talc 30 weight parts | " | " | " | " | " | A | A | 0.45 |
| Ex. 8 | Example 1 + clay 30 | " | " | " | " | " | A | A | 0.45 |

Table-continued

| | Base Resin | Master Batch Resin | Quantity of aging inhibitor in master batch (Weight parts as against 100 weight parts of master batch resin) | Master batch compounding temperature (°C) | Quantity of crosslinking agent in weight parts (weight parts as against 100 weight parts of total resin) | Quantity of aging inhibitor in weight parts (Weight parts as against 100 weight parts of total resin) | Aging Characteristics | Electrical characteristics | Average VA content of final product (%) |
|---|---|---|---|---|---|---|---|---|---|
| Ex. 9 | weight parts low density polyethylene MI = 1.1 | " | " | 250 | " | *7 F 0.3 | A | A | 0.45 |
| Ex. 10 | " | " | " | 160 | " | *8 C 0.3 | A | A | 0.45 |
| Ex. 11 | " | " | " | 180 | DCP 3 | SWC 0.5 | A | SA | 1.5 |
| Ex. 12 | " | " | " | " | " | SWC 1 | A | SA | 1.5 |
| Ex. 13 | low density polyethylene MI = 1.1 | EVA vinyl acetate content 10 weight-% | 2 | 180 | DCP 3 | SWC 1 | A | SA | 5 |
| Ex. 14 | " | EVA vinyl acetate content 35 weight-% | 8 | " | " | " | A | SA | 4.4 |
| Ref. 14 | " | EVA vinyl acetate content 10 weight-% | 1 | " | " | " | A | B | 10 |
| Ref. 15 | " | EVA vinyl acetate content 35 weight-% | 4 | " | " | " | A | A | 8.8 |

As is seen from the examples of embodiment, improvement in the aging characteristic and electrical characteristics cannot be effected unless a master batch with an aging inhibitor is previously or first compounded at a temperature which is at least equal to its melting point before adding the polyethylene. It is also noted that if ethylene-vinyl acetate copolymer containing 10 - 35 weight-% vinyl acetate is used as a resin for the master batch, it is possible to remarkably improve the aging characteristic and electrical characteristics. Where the vinyl acetate content is 10% or less, no improvement in the aging characteristic is effected. On the other hand, when the content is 40% or more, the electrical characteristics are unfavorably affected. That is to say, good results can be obtained only when ethylene-vinyl acetate copolymer, whose vinyl acetate content is 10 - 35 weight-%, is used as the master batch resin.

It may be further ascertained from the foregoing examples and references that if the master batch is added in a quantity such that the average quantity of the VA content in the final product exceeds 5 weight-% of the resin, the characteristics of the final product are unsatisfactory as compared to the situations wherein the average VA content of the final product is 5 weight-% or less of the resin.

It has also been ascertained that the above-mentioned effects remain unchanged no matter what kind of low density polyethylene is used for the base resin, or no matter whether a filler or the like is added or not. As aging inhibitors, the following examples may be used: 4-4'-thio-bis-(6-tertiary-butyl-m-cresol) (called SWC: Mp = 160°C), N-N'-di-β-naphthyl-P-phenylene-diamine (called P, MP = 230°C), the condensation product of aldol and α-naphthylamine (called C, MP = 150°C), etc. Any other aging inhibitor which is commonly used may also be employed. A mixture of two or more of the above-mentioned aging inhibitors may also be used.

As already stated, it has been hereby discovered that a crosslinked polyethylene compound having both an excellent aging characteristic and excellent electrical characteristics can be obtained only by first preparing a master batch by compounding 100 parts of ethylene-vinyl acetate copolymer containing 10 - 35 weight-% vinyl acetate and 1 - 20 weight parts of an aging inhibitor at a temperature which is at least equal to the melting point of the selected aging inhibitor and then compounding this master batch with ordinary low density polyethylene and a crosslinking agent, and if necessary adding a filler or the like in suitable quantities. Of course, the quantity of master batch and low density polyethylene to be incorporated is determined by the amount of aging inhibitor and vinyl acetate which are included in the final product as previously set forth.

By using the crosslinked polyethylene compound made in this way, crosslinked polyethylene insulated cable of excellent aging characteristics and excellent electrical characteristics is obtained.

We claim:

1. A method of manufacturing a polyethylene compound comprising the steps of preparing a master batch by compounding 100 weight parts of ethylene-vinyl acetate copolymer containing 10 - 35 weight-% vinyl acetate and 1 - 20 weight parts of at least one aging inhibitor, at a temperature at least equal to the melting point of the selected aging inhibitor, and thereafter compounding the master batch with ordinary low density polyethylene and a crosslinking agent in a quantity such that the final mixture contains no more than one part of said aging inhibitor per each one hundred parts resin and an average quantity of vinyl acetate of no more than five weight per cent of the resin.

2. The method of claim 1 wherein 4-4'-thio-bis-(6-tertiary-butyl-m-cresol) is selected as said aging inhibitor and said temperature is selected as 160°C or higher.

3. The method of claim 1 wherein N-N'-di-β-naphthyl-P-phenylene-diamine is selected as said aging inhibitor and said temperature is selected as 230°C or higher.

4. The method of claim 1 wherein the condensation product of aldol and α-naphthylamine is selected as said aging inhibitor and said temperature is selected as 230°C or higher.

5. The method of claim 1 which also includes the step of finally extruding the polyethylene compound on an electric conductor for insulation.

* * * * *